Aug. 30, 1955

R. W. HOWERY 2,716,746

FOCUSING OF RADAR BEAMS FOR A TRACKING RADAR

Filed Oct. 31, 1950

INVENTOR
Richard W. Howery
BY *J. L. Whittaker*
ATTORNEY

United States Patent Office 2,716,746
Patented Aug. 30, 1955

2,716,746

FOCUSING OF RADAR BEAMS FOR A TRACKING RADAR

Richard W. Howery, Camden, N. J., assignor to Radio Corporation of America, a corporation of Delaware Application October 31, 1950, Serial No. 193,106

12 Claims. (Cl. 343—7.4)

The present invention is related to radar (radio echo detection and ranging) systems, and more particularly to a novel system and a novel method of operation of a radar set.

In radar sets in the past, various types of antennas have been used which focus the energy either as received or transmitted from the radar set. The point of focus of the antenna is usually infinity. Thus radiated outgoing energy is made to travel as nearly as possible in parallel paths. Sometimes, the energy is focused at a particular point usually far distant, so that the distance of the point of focus from the antenna system is very great. Such sets work well for targets which are located at a great distance compared with the aperture or effective aperture of the lens system. For short wavelengths and where the distance to the reflecting object is not great compared to the effective aperture of the focusing system, the energy may be focused at a particular point near where the expected object is located. Thus in a Ground Control Approach (G. C. A.) radar, the antenna may be focused at the desired touchdown point of the glide path. Unfortunately, for closely located objects, such as an airplane at the touchdown point in a G. C. A. radar, as the distance to the object changes, the object is likely to be seriously out of focus. Under these conditions, with a high resolution desired, when the object is at a much different distance from the antenna than is the point of focus, the object cannot be properly tracked in its position and cannot be properly located because of the lack of depth of focus. The advantages of the high resolution antenna focusing system are thus of no avail to increase the accuracy of object location.

Accordingly, it is an object of the present invention to improve a radar set and its operation.

It is a further object of the invention to maintain the high resolution and proper focus of a radar focusing antenna system.

It is another object of the invention to improve the operation of focused microwave antennas particularly in conjunction with radar systems.

In accordance with the invention, the point of focus of an antenna focusing system in a radar set remote or distant from the energy radiator or receptor is changed in response to the range to the object measured by the radar set. The focus and the range are thereby made to conform. This mode of operation keeps the antenna system at substantially the optimum focus for operation to track the object under examination with the best accuracy of which the radar set is capable. The particular embodiments illustrated herein are preferred for their simplicity and effectiveness. In these, a simple focusing antenna system is employed comprising a simple lens (refractive or reflective) and a horn element. In this case, it is readily shown that the distance between the elements varies inversely as the distance of the conjugate focal point remote from the horn. Simply apparatus may therefore be employed to vary the distance between the elements in inverse proportionality to the range so that the focus conforms to the range. The method of the invention may be practiced with a wide variety of apparatus, as will be obvious from the examples illustrated.

The foregoing objects and other objects, advantages, and novel features of the invention will be more apparent from the following description when taken in connection with the accompanying drawing in which:

Fig. 1 is a schematic drawing partly in block diagram form illustrating one embodiment of the invention; and Fig. 2 is a schematic view of an alternative antenna focusing system using a reflector which may be used with the embodiment of Fig. 1.

Referring now more particularly to Fig. 1, a radar set 10 comprises a transmitter 12, a receiver 14, and a transmit-receive arrangement 16. The transmit-receive arrangement is connected by waveguide 18, flexible at least in part, to a horn element 20 of an antenna focusing system exemplified by the simple lens system 22 which also includes a refractive lens element 24. The receiver 14 includes a range indicator shaft 26 the angular rotation of which may be assumed to be directly proportional to the range indicated by the apparatus 10. The shaft 26 is mechanically connected to the shaft 28 of a range potentiometer 30 one extreme terminal of which is grounded and the other of which at a junction A joins the output of a high gain amplifier 32. An arm 34 of potentiometer 30 is connected through a resistor 36 to a junction B to supply feedback at the input of high gain amplifier 32. A constant voltage V is supplied through a resistor 38 to the junction B. The output of the high gain feedback amplifier 32 is supplied through a resistor 47 to an error amplifier voltage 40. From the movable arm 42 of a potentiometer 44 a voltage is supplied through a resistor 46 to the error voltage amplifier 40 at the junction C. Thus the input to the error voltage amplifier 40 is the difference between the voltage picked up at the arm 42 of the potentiometer 44 and the output at junction A of the high gain feedback amplifier 32. The error voltage amplifier 40 may include for example well known "chopping" circuits which convert the D. C. at the input to an A. C. output which output is supplied over a connection 48 to one winding 50 of a motor 52. The other winding 54 of motor 52 is supplied with an alternating voltage either in or out of phase with that supplied to winding 50. The motor 52 is mechanically connected to a rack and pinion gear 56 whereby the antenna horn element 20 is moved with relation to the dielectric lens element 24 along the optical axis of the lens assembly in a direction to make the voltage input to the error voltage amplifier 40 a null.

In operation, the transmitter 12 and the receiver 14 are selectively and alternatively connected by the TR arrangement 16 through waveguide 18 to the horn 20. The transmitter is connected during periods of transmission of pulses of energy and the receiver is connected to the horn 20 in the intermediate receiving periods. Thus both received and transmitted energy are focused by the lens system. The receiver measures the time difference between transmisison and reception of a pulse to derive a measure of the range to some reflecting object such as an airplane 58. Let the far point of focus of the lens system 22 and horn 20 be represented by R and the distance from the horn element 20 to the dielectric lens element 25 by D. Let the focal distance of the lens element 24 be F. From optical theory then $$\frac{1}{R}+\frac{1}{D}=\frac{1}{F} \tag{1}$$

for a simple type of lens system. Also $$D=Z+F \tag{2}$$

where Z is the displacement of the horn element 20 from the near focal point for focus at infinity. Therefore, $$Z = \frac{F^2}{R-F} \quad (3)$$

F is a constant determined by the lens design. In a practical case, it may be assumed that R is very much greater than F, say at least ten times (and more often of the order of at least 100 times). In this event, Z is substantially inversely proportional to R. It is a feature of the invention that the distance D is now controlled to make the distance R, the distance of the distant point of focus from the lens system, conform to the distance or range to the object under detection such as the airplane 58. It may be further assumed that there either is only one object under consideration or that the receiver is "gated" in well known manner so that it is measuring the distance to only one selected object or target such as the airplane 58. It is preferable then to have the distance D automatically controlled so that R and the range conform. Accordingly, let the gain of the high gain feedback amplifier 32 be X without any feedback and let the amount of negative feedback from arm 34 be Y. Then the resultant total gain G of the feedback amplifier 32 may be $$G = \frac{X}{1-XY}$$

However, the amplifier is chosen with such a large gain that XY is large compared with unity, that is at least ten times as great as unity. Then G is substantially proportional to the inverse of Y, the voltage fed back. Since a constant voltage V is supplied at the output of the high gain feedback amplifier and Y is proportional to the range, then the output voltage at junction A is also substantially inversely proportional to the range. At the point C this voltage from A and the voltage from potentiometer arm 42 proportional to the displacement Z of the horn antenna element 20 from the focal distance from the lens element 24 are subtracted to give an error voltage. The servo mechanism loop comprising the error voltage amplifier 40, the motor 52, the rack and pinion gear 56 (which moves the antenna element 20 as the servo load), and the potentiometer 44 maintains the antenna element 20 displaced from the near focal point of the lens system for distant focus at infinity by a distance which is substantially inversely proportional to the range of the object under detection in response to this error voltage. Accordingly, the distance of the far focal point of the lens assembly and horn is kept substantially equal to the range to the object under examination or detection. The distance D is then substantially given by $D = K/R + F$ where K is a constant. The distance between the elements is substantially a constant plus a displacement inversely proportional to range. Thus the distance to the far point of focus and range are kept substantially equal.

In further explanation, if the range to the object 58 measured along the optical axis is such that the distance $d$, (which is the path difference between energy from the edge of lens 24 and energy from the optical center of lens 24) becomes as great as a ¼ to a ⅙ of a wavelength at the operating frequency, it becomes important to use the principles of the invention. Therefore, it will be seen that if the effective aperture is sufficiently great considering the wavelength of the energy radiated in relation to the range within which objects are to be tracked by the radar set, the system is most useful. These conditions may be expected to rise for example in ground control approach radar sets, where it is wished to track an airplane to a point as close as 200 or 300 yards from the radar set antenna with great accuracy. The requirement calls for high resolution, in turn leading to a lens system of large effective aperture. The particular advantage derived now is that there is sufficient resolution to track the object with great accuracy in both azimuth and elevation (means for doing so have not been shown herein because not directly related to the invention but are well known); whereas if the invention is not used the resolution necessary to track the target with great absolute accuracy may be lost. Furthermore, in order to closely track the object with great accuracy, the airplane such as 58 may carry a corner reflector or the like so that a particular part of the airplane may be tracked with great accuracy and the plane may then be "talked down" with its absolute position well known to the ground operator at all times.

An alternative embodiment is illustrated in Fig. 2 in which the motor 52 operates a rack and pinion gear on which a reflector lens element 60 is moved relative to the horn 20. In this case the reflector lens element becomes the servo load. It is readily apparent that the desired displacement of the reflector element 60 is also substantially inversely proportional to the range. Further explanation of this embodiment of the invention is not believed necessary.

Various arrangements may be employed, such as a more complex lens system, different servo devices for appropriately positioning the load antenna, and that for a more complex lens system, the desired variation of the distance of a lens element from that position giving infinite focus may be other than an inverse proportionality.

The invention has thus been described as a novel radar system, and as a novel method of operation of a radar system, which enables an object to be tracked making best use of the radar system's capabilities and to secure optimum benefit from a high resolution antenna system employed therewith.

What is claimed is:

1. A radiant energy echo detection and ranging apparatus comprising a radiant energy transmitter, a receiver to receive and detect echoes of the transmitted energy from radiant energy reflecting objects, and having means to measure the time elapsed between transmission of said energy and reception of the echoed energy thereby to measure the range to a reflecting object, an energy focusing antenna system coupled to at least one of said transmitter and said receiver to focus energy to or from a distant focal point with means to change the distance from said system to said focal point, said last named means being coupled to and responsive to said means to measure the range whereby the distance from the system to said focal point is changed in response to changes in the measured range.

2. A radiant energy echo detection and ranging apparatus comprising a radiant energy transmitter, an energy focusing antenna system coupled to said transmitter to focus energy to or from a distant point of focus and with means to vary the distance of said point of focus from said energy focusing system, a receiver to receive and detect echoes of the transmitted energy from radiant energy reflecting objects and having means to measure the time elapsed between transmission of said energy and reception of the echoed energy thereby to measure the range to a reflecting object, said means to vary the point of focus distance being coupled to and responsive to said means to measure the range whereby the distance from said focusing system to said point of focus is varied in response to variations in the measured range.

3. A radio echo detection and ranging apparatus comprising a radiant electromagnetic energy transmitter, an energy focusing system coupled to said transmitter to focus the energy of transmission with means to vary the distance from said energy focusing system to a distant point of focus of said energy, a receiver to receive and detect echoes of the transmitted energy from radiant energy reflecting objects, and means to measure the time elapsed between transmission of said energy and reception of the echoed energy thereby to measure the range to a reflecting object, said means to vary the point of focus being coupled to and responsive to said means to measure the range whereby the distance from said focusing system to said point of focus is varied in response to variations in the measured range.

4. The apparatus claimed in claim 2, said energy focusing system including at least two elements, said means to vary the distance to said point of focus including means to move one said element with respect to the other.

5. The apparatus claimed in claim 3, said energy focusing system including a feed element coupled to said transmitter.

6. The apparatus claimed in claim 3, said energy focusing system including a feed element coupled to said transmitter and a dielectric lens element.

7. The apparatus claimed in claim 3, said energy focusing system including a feed element coupled to said transmitter and a dielectric lens element, said means to vary the distance to said point of focus including means to move one of said elements relative to the other.

8. The apparatus claimed in claim 3, said energy focusing system including a feed element coupled to said transmitter and a dielectric lens element, said means to vary the said distance to the point of focus including means to vary the distance between said elements in response to the range, the said distance between said elements being maintained substantially equal to a constant plus a displacement inversely proportional to the range.

9. The apparatus claimed in claim 3, said energy focusing system including a feed element coupled to said transmitter and a reflective lens element.

10. The apparatus claimed in claim 3, said energy focusing system including a feed element coupled to said transmitter and a reflective lens element, said means to vary the said distance to said point of focus including means to move one of said elements relative to the other.

11. The apparatus claimed in claim 3, said energy focusing system including a feed element coupled to said transmitter and a reflective lens element, said means to vary the said distance to said point of focus including means to vary the distance between said elements in response to the range, the said distance between said elements being maintained substantially equal to a constant plus a displacement inversely proportional to the range.

12. A radio echo detection and ranging apparatus comprising a radiant energy transmitter, a receiver to receive and detect echoes of the transmitted radiant energy from reflecting objects and having means to measure the time elapsed between transmission of said energy and reception of the echoed energy thereby to measure the range to a deflecting object, said means including a shaft the angular rotation of which is directly proportional to the measured range, an energy focusing antenna system coupled to said transmitter during transmission therefrom and to said receiver during energy reception of said echoes and comprising a horn element and a lens element, one of said elements being movable by a rack and pinion gearing, a first potentiometer having a pick-up arm mechanically connected to said shaft, a high gain amplifier having an input and an output and connected to impress its output across said potentiometer, a supply of substantially constant voltage connected to said high gain amplifier input, said pick-up arm being also connected to said high gain amplifier input, two resistors having a common junction, an error voltage amplifier having an input and an output said input being connected to said junction, a motor having a shaft mechanically coupled to said rack and pinion gearing to move said one element, a second potentiometer having a pick-up arm mechanically coupled to said rack and pinion gearing and electrically connected to said junction through said other resistor, whereby said one element is displaced from that position with respect to the other which makes the distant point of focus of the system at infinity by an amount substantially inversely proportional to the range.

References Cited in the file of this patent

UNITED STATES PATENTS

| | | |
|---|---|---|
| 1,934,078 | Ludenia | Nov. 7, 1933 |
| 2,078,302 | Wolff | Apr. 27, 1937 |
| 2,083,292 | Cawley | June 8, 1937 |
| 2,142,648 | Linder | Jan. 3, 1939 |
| 2,159,937 | Zworykin | May 23, 1939 |
| 2,173,234 | Linder | Sept. 19, 1939 |
| 2,429,933 | Gibson | Oct. 28, 1947 |
| 2,524,292 | Iams | Oct. 3, 1950 |
| 2,530,580 | Lindenblad | Nov. 21, 1950 |

FOREIGN PATENTS

| | | |
|---|---|---|
| 860,950 | France | Jan. 28, 1941 |